United States Patent
Du et al.

(10) Patent No.: US 11,900,038 B2
(45) Date of Patent: Feb. 13, 2024

(54) SIMULATION METHOD AND DEVICE, POWER WIRE TOPOLOGY NETWORK, TEST CIRCUIT AND STORAGE MEDIUM

(71) Applicant: CHANGXIN MEMORY TECHNOLOGIES, INC., Hefei (CN)

(72) Inventors: Tao Du, Hefei (CN); Fan Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 189 days.

(21) Appl. No.: 17/448,050

(22) Filed: Sep. 18, 2021

(65) Prior Publication Data

US 2022/0229962 A1    Jul. 21, 2022

Related U.S. Application Data

(63) Continuation of application No. PCT/CN2021/104786, filed on Jul. 6, 2021.

(30) Foreign Application Priority Data

Jan. 19, 2021  (CN) .......................... 202110070959.2

(51) Int. Cl.
  *G06F 30/367* (2020.01)
  *G06F 30/392* (2020.01)
  *G06F 30/20* (2020.01)

(52) U.S. Cl.
  CPC ............ *G06F 30/367* (2020.01); *G06F 30/20* (2020.01); *G06F 30/392* (2020.01)

(58) Field of Classification Search
  CPC ...... G06F 30/367; G06F 30/392; G06F 30/20; G06F 2119/06
  See application file for complete search history.

(56) References Cited

U.S. PATENT DOCUMENTS

2011/0197170 A1   8/2011  Chandramohan
2011/0270598 A1*  11/2011  Zou ...................... G06F 30/367
                                                      716/103

(Continued)

FOREIGN PATENT DOCUMENTS

CN    102364482 A    2/2012
CN    107784146 A    3/2018

(Continued)

OTHER PUBLICATIONS

Jakusovszky Linear IC Parasitic Element Simulation Methodology IEEE 1993 (Year: 1993).*

*Primary Examiner* — Rehana Perveen
*Assistant Examiner* — Cuong V Luu
(74) *Attorney, Agent, or Firm* — Syncoda LLC; Feng Ma

(57) ABSTRACT

A simulation method and device, a power wire topology network, and a test circuit involve: a power wire topology network is generated according to a power wire layout, the power wire topology network including a plurality of first layer of metal wires arranged in a transverse direction, a plurality of second layer of metal wires arranged in a longitudinal direction, power child nodes and a parasitic element, the parasitic element being located between the two power child nodes; a minimum voltage of the power input node of each circuit nodule in a circuit corresponding to the power wire topology network is determined, the power input node being one of the power child nodes in each circuit module; and a time sequence simulation is performed according to the minimum voltage of the power input node of each circuit module and the post-simulation circuit network list of an integrated circuit.

13 Claims, 11 Drawing Sheets

(56) References Cited

U.S. PATENT DOCUMENTS

| | | | |
|---|---|---|---|
| 2013/0318489 A1 | 11/2013 | Chandramohan | |
| 2015/0143314 A1 | 5/2015 | Chen et al. | |
| 2018/0018410 A1* | 1/2018 | Chang | G06F 30/327 |
| 2021/0240898 A1 | 8/2021 | Zhang et al. | |
| 2021/0374318 A1* | 12/2021 | Yang | G06F 30/392 |

FOREIGN PATENT DOCUMENTS

| | | |
|---|---|---|
| CN | 108595825 A | 9/2018 |
| CN | 110895648 A | 3/2020 |

\* cited by examiner

SIMULATION METHOD AND DEVICE, POWER WIRE TOPOLOGY NETWORK, TEST CIRCUIT AND STORAGE MEDIUM

CROSS-REFERENCE TO RELATED APPLICATIONS

This is a continuation of International Application No. PCT/CN2021/104786 filed on Jul. 6, 2021, which claims priority to Chinese Patent Application No. 202110070959.2 filed on Jan. 19, 2021. The disclosures of these applications are hereby incorporated by reference in their entirety.

BACKGROUND

At present, the design process of integrated circuit design includes circuit design, pre-simulation, layout design, post-simulation and other processes. Herein, the circuit design is specifically to complete the design of a circuit according to circuit functions, and the pre-simulation specifically performs the simulation of the circuit functions, including the simulation of power consumption, current, voltage, temperature, input and output features and other parameters. The pre-simulation does not consider the influence of parasitic capacitance resistance generated by metal wire routing in the circuit. After the layout design is completed, the parasitic capacitance resistance is extracted again, and the extracted parasitic capacitance resistance is added to the circuit for post-simulation and circuit design verification and optimization. If the verification fails, the layout design is adjusted until to pass the verification, and then the finial layout is determined.

SUMMARY

This disclosure relates to, but is not limited to, a simulation method and device, a power wire topology network, a test circuit and a storage medium.

Embodiments of this application provide a simulation method, including the following operations.

A power wire topology network is generated according to a power wire layout, the power wire topology network includes a plurality of first layer of metal wires arranged in a transverse direction, a plurality of second layer of metal wires arranged in a longitudinal direction, power child nodes and a parasitic element, and the parasitic element is located between the two power child nodes.

The minimum voltage of a power input node of each circuit module in a circuit corresponding to the power wire topology network is determined, and the power input node is one of the power child nodes in each circuit module.

Time sequence simulation is performed according to the minimum voltage of the power input node of each circuit module and the post-simulation circuit network list of an integrated circuit.

Embodiments of this application further provide a simulation device, which includes a memory and a processor.

The memory is configured to store an executable instruction of the processor.

The processor is configured to:
generate a power wire topology network according to a power wire layout. The power wire topology network includes a plurality of first layer of metal wires arranged in a transverse direction, a plurality of second layer of metal wires arranged in a longitudinal direction, power child nodes and a parasitic element, and the parasitic element is located between the two power child nodes;

determine the minimum voltage of a power input node of each circuit module in a circuit corresponding to the power wire topology network. The power input node is one of the power child nodes in each circuit module; and perform time sequence simulation according to the minimum voltage of the power input node of each circuit module and the post-simulation circuit network list of an integrated circuit.

Embodiments of this application further provide a computer-readable storage medium, which stores a computer execution instruction, and when being executed by a processor, the computer execution instruction is configured to implement any method in the first aspect and various possible implementation modes of the first aspect.

Embodiments of this application further provide a computer program product, which includes a computer program, and when being executed by a processor, the computer program is configured to implement any method in the first aspect and various possible implementation modes of the first aspect.

Embodiments of this application further provide a power wire topology network, which includes a plurality of first layer of metal wires arranged in a transverse direction, a plurality of second layer of metal wires arranged in a longitudinal direction, power child nodes and a parasitic element.

The parasitic element is located between the two power child nodes.

Herein, the intersections of the first layer of metal wires and the second layer of metal wires are the power child nodes.

Embodiments of this application further provide a test circuit, which includes at least one power source and the power wire topology network in any one of the fifth aspect and various possible implementation modes of the fifth aspect.

The input current of each current source is the current of each circuit module in the circuit corresponding to the power wire topology network.

A quantity of the power source is same as that of the circuit module included in the circuit corresponding to the power wire topology network.

BRIEF DESCRIPTION OF THE DRAWINGS

To better clarify the technical solution of this application or the related art, the drawings required to illustrate the embodiments or the related art will be simply described below. It is apparent that the drawings described below merely illustrate some embodiments of this application. Those ordinarily skilled in the art can obtain other drawings without creative labor on the basis of those drawings.

DETAILED DESCRIPTION

Figure 1:
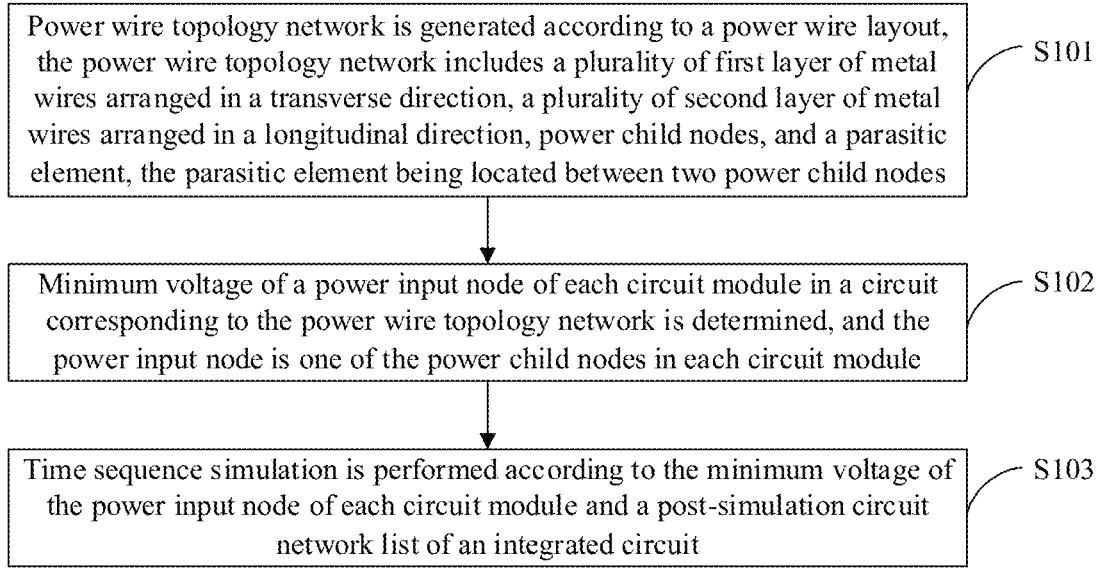
FIG. 1 is a flow schematic diagram of a simulation method according to embodiments of this application.

In order to make the purpose, technical solution and advantages of this application clearer, the technical solutions in this application are clearly and completely elaborated below in combination with the drawings. It is apparent that the described embodiments are only a part of the embodiments of this application but not all. Based on the embodiments of this application, all the other embodiments obtained by those of ordinary skill in the art on the premise of not contributing creative effort should belong to the protection scope of this application.

During a typical simulation process, on one hand, repeated verification is required, and on the other hand, the network list scale of the layout post-simulation including the parasitic capacitance resistance is very large and the simulation time is long, resulting in a slow simulation speed.

In the current integrated circuit design process, if the network list scale of the post-simulation including the parasitic capacitance resistance of the power wire layout is very large, the simulation time is very long, therefore actual project demands cannot be met. However, if the post-simulation network list does not include a power wire parasitic element, the influence of the power layout parasitism on the time sequence feature cannot be accurately evaluated, thereby reducing simulation precision. In order to solve this problem, this application provides a simulation method and device, a power wire topology network, a test circuit and a storage medium. In the simulation method provided by this application, the power wire topology network is generated according to the power wire layout first, and then the minimum voltage of the power input node of each circuit module in the circuit corresponding to the power wire topology network is determined, finally, the time sequence simulation is performed according to the minimum voltage of the power input node of each circuit module and the integrated circuit post-simulation circuit network list. Herein, the integrated circuit post-simulation circuit network list is a layout post-simulation network list not including the parasitic capacitance resistance, namely, the simulation time is approximately the same as the pre-simulation time not including a power parasitic effect. Therefore, the post-simulation result can be quickly obtained, the simulation speed is improved, and the time sequence simulation considers the minimum voltage of the power input node of each circuit module. The difference between the minimum voltage and the ideal power voltage is the power wire IR-Drop, therefore the influence of the power wire IR-Drop on the time sequence parameter of the integrated circuit can be evaluated through the normal time sequence simulation, and the simulation precision can be improved. The time sequence parameter includes, for example, time delay and other time sequence parameters, thereby achieving the compromise between simulation precision and simulation speed.

The simulation method provided by this application can be applied before the layout design and during the layout design. The power wire IR-Drop in the power wire layout will generate influence on the time sequence parameter of the integrated circuit. The simulation method provided by the application determines the minimum voltage of the power input node of each circuit module in the circuit corresponding to the power wire topology network through generating the power wire topology network according to the power wire layout, namely determines the power wire IP-Drop. The time sequence simulation is performed according to the minimum voltage of the power input node of each circuit module and the post-simulation circuit network list of the integrated circuit, the influence of the power wire IP-Drop on the time sequence parameter of the integrated circuit can be evaluated through the simulation result, therefore guidance can be provided to the design of the integrated circuit. When the layout design is completed, the parasitic resistance and parasitic capacitance of the whole circuit are extracted and subjected to post-simulation, the time sequence result can be checked again according to the post-simulation result, such that the final guidance can be provided to the layout design. Therefore, the error of the layout design can be reduced, and the development period and development cost of the integrated circuit design are reduced.

The simulation method and device, the power wire topology network, the test circuit and the storage medium process/structure are described in details below through embodiments.

FIG. 1 is a flow schematic diagram of a simulation method according to embodiments of this application. An executive body of the simulation method in this embodiment can be a simulation device or a piece of simulation equipment, which can be applied before the layout design. As shown in FIG. 1, the simulation method of this embodiment may include the following operations.

At S101, a power wire topology network is generated according to a power wire layout, the power wire topology network includes a plurality of first layer of metal wires arranged in a transverse direction, a plurality of second layer of metal wires arranged in a longitudinal direction, power child nodes and a parasitic element, and the parasitic element is located between the two power child nodes.

Figure 2:
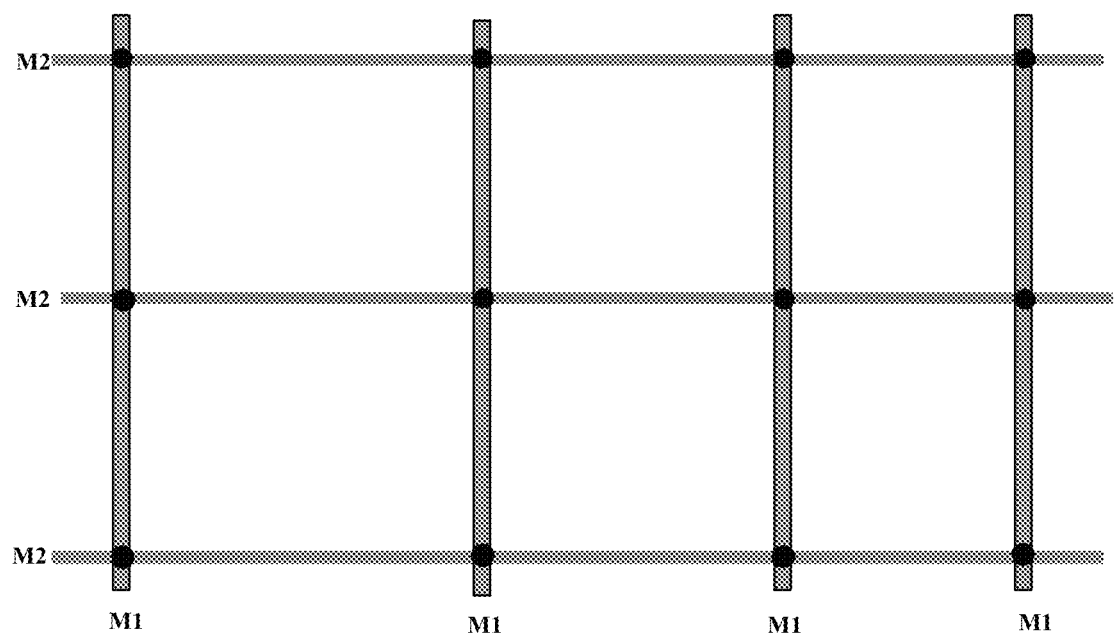
FIG. 2 is a schematic diagram of a power wire layout.

In some embodiments, FIG. 2 is a schematic diagram of a power wire layout. As shown in FIG. 2, the power wire layout is composed of four first layer of metal wires M1 and three second layer of metal wires M2, the first layer of metal wires M1 can be located above or below the second layer of metal wires M2, and each first layer of metal wire M1 has an intersection with each second layer of metal wire.

Figure 3:
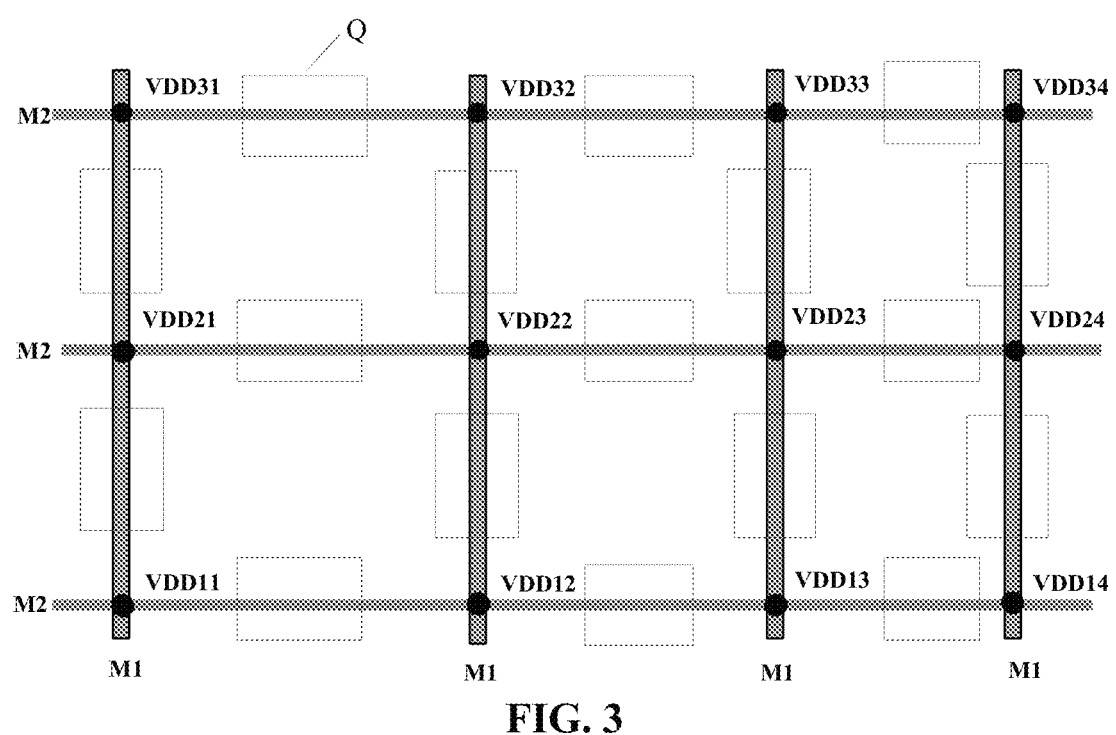
FIG. 3 is a schematic diagram of a power wire topology network generated by the power wire layout shown in FIG. 2.

The power wire topology network is generated according to the power wire layout. Taking the power wire layout shown in FIG. 2 as an example, FIG. 3 is a schematic diagram of a power wire topology network generated by the power wire layout shown in FIG. 2. As shown in FIG. 3, the power wire topology network includes the plurality of first layer of metal wires M1 arranged in a transverse direction, the plurality of second layer of metal wires M2 arranged in a longitudinal direction, the power child nodes (VDD11-VDD31) and the parasitic element Q. Herein, the intersections of the first layer of metal wires and the second layer of metal wires in the power wire layout are the power child nodes, the parasitic element is located between the two power child nodes, and one parasitic element is arranged between every two power child nodes.

The power wire topology network is generated according to the power wire layout, as an implementable mode, the power wire topology network can include the following operations.

At S1011, the intersections of the first layer of metal wires and the second layer of metal wires are determined as the power child nodes.

At S1012, the parasitic element is arranged every two power child nodes, and the parasitic element includes a first parasitic resistance, a second parasitic resistance and a parasitic capacitance. Herein, a first end of the first parasitic resistance is connected to a first power child node, a second end of the first parasitic resistance is connected to a first end of the second parasitic resistance and a first end of the parasitic capacitance, a second end of the second parasitic resistance is connected to the second power child node, and a second end of the parasitic resistance is connected to a grounding terminal.

At S1013, the power wire topology network is obtained according to the first layer of metal wires, the second layer of metal wires, the power child nodes and the parasitic element.

Figure 4:
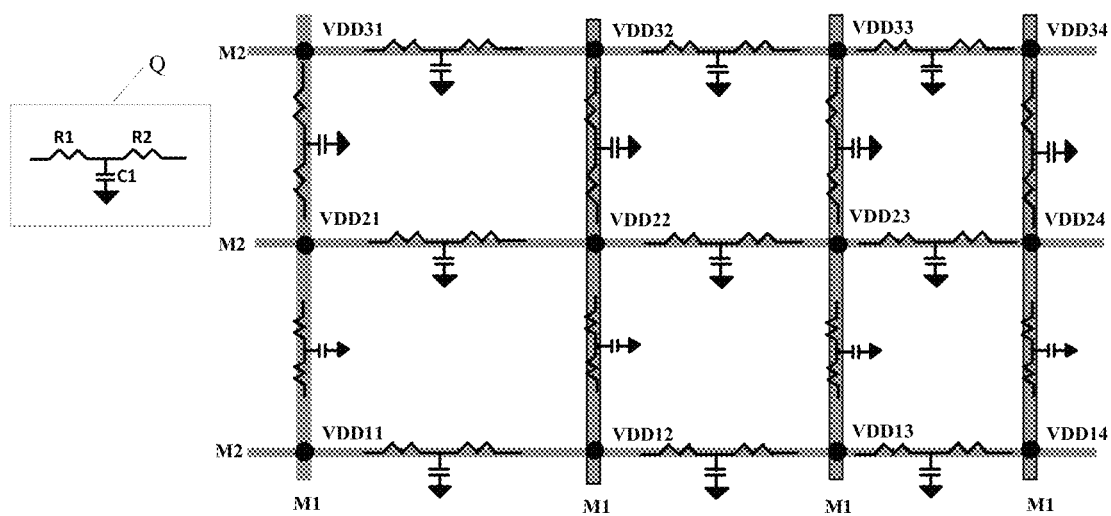
FIG. 4 is a schematic diagram of a power wire topology network generated by the power wire layout shown in FIG. 2.

Taking the power wire layout shown in FIG. 2 as an example, FIG. 4 is a schematic diagram of a power wire topology network generated by the power wire layout shown in FIG. 2. As shown in FIG. 4, the parasitic element Q is arranged between every two power child nodes, the parasitic element Q includes a first parasitic resistance R1, a second parasitic resistance R2 and a parasitic capacitance C1. Taking the parasitic element between the power child node VDD31 and the power child node VDD32 as an example, the first end of the first parasitic resistance R1 is connected to the first power child node VDD31, the second end of the first parasitic resistance R1 is connected to the first end of the second parasitic resistance R2 and the first end of the parasitic capacitance C1, the second end of the second parasitic resistance R2 is connected to the second power child node VDD32, and the second end of the parasitic capacitance C1 is connected with the grounding terminal.

Herein, the resistance values of the first parasitic resistance R1 and the second parasitic resistance R2 are each R/2, and the capacitance value of the parasitic capacitance is C. R and C are determined according to the following formula.

$$R=Rsh*L/W;$$

$$C=Cu*L*W.$$

Herein, L is the length of a metal wire between the power child nodes, W is the width of the metal wire between the power child nodes, Rsh is the sheet resistance value of the metal, and Cu is the capacitance value of a unit area.

It should be understood that the metal wires between different power child nodes have different lengths and widths, when the generated power wire topology network is subjected to a subsequent simulation, the initial length and the initial width of the metal wire between the power child nodes can be set according to an empirical value, such that an initial power wire topology network is obtained. The time sequence simulation is performed through S102 and S103 according to the initial power wire topology network, the length and width of the metal wire between every two power child noes in the initial power wire topology network can be adjusted according to the simulation result, such that the adjusted power wire topology network can be obtained. The time sequence simulation is performed through S102 and S103 according to the adjusted power wire topology network until the power wire topology network of which the power wire IR-Drop has less influence on the time sequence parameter of the integrated circuit is determined through the simulation. The embodiments of this application do not make any limitations to the specific adjustment rules for the length and width of the metal wire between every two power child nodes.

At S102, the minimum voltage of a power input node of each circuit module in a circuit corresponding to the power wire topology network is determined, and the power input node is one of the power child nodes in each circuit module.

Figure 5:
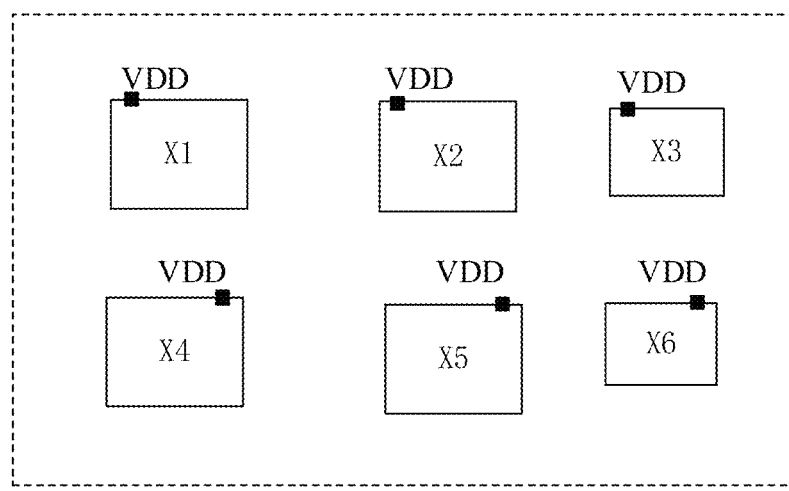
FIG. 5 is a schematic diagram of a circuit module included in a circuit corresponding to the power wire topology network shown in FIG. 3.

In some embodiments, taking the power wire topology network shown in FIG. 3 or FIG. 4 as an example, FIG. 5 is a schematic diagram of a circuit module included in a circuit corresponding to the power wire topology network shown in FIG. 3. As shown in FIG. 5, the circuit corresponding to the power wire topology network shown in FIG. 3 includes six circuit modules (X1-X6), the power input node of each circuit module is VDD shown in FIG. 5, and it can be seen that the power input node of each circuit module is one of the power child nodes in each circuit module.

Herein, the minimum voltage of the power input node of each circuit module in the circuit corresponding to the power wire topology network is determined, taking the circuit module shown in FIG. 5 as an example, namely, the minimum voltage of the power input node VDD of each circuit module in the circuit module X1-X6 is determined.

At S103, the time sequence simulation is performed according to the minimum voltage of the power input node of each circuit module and the post-simulation circuit network list of the integrated circuit.

Herein, the post-simulation circuit network list of the integrated circuit is a layout post-simulation network list not including the parasitic capacitance resistance, and the simulation result obtained in S103 is the time sequence analysis result considering the influence of the maximum IR-Drop.

According to the simulation method provided by the embodiments, the power wire topology network is generated according to the power wire layout first, and then the minimum voltage of the power input node of each circuit module in the circuit corresponding to the power wire topology network is determined, finally, the time sequence simulation is performed according to the minimum voltage of the power input node of each circuit module and the post-simulation circuit network list of the integrated circuit. Herein, the post-simulation circuit network list of the integrated circuit is a layout post-simulation network list not including the parasitic capacitance resistance, namely, the simulation time is approximately the same as the pre-simulation time not including a power parasitic effect. Therefore, the post-simulation result can be quickly obtained, the simulation speed is improved, and the time sequence simulation considers the minimum voltage of the power input node of each circuit module. The difference between the minimum voltage and the ideal power voltage is the power wire IR-Drop, thus the influence of the power wire IR-Drop on the time sequence parameter of the integrated circuit can be evaluated through the normal time sequence simulation, and the simulation precision can be improved, thereby achieving the compromise between simulation precision and simulation speed.

Figure 6:
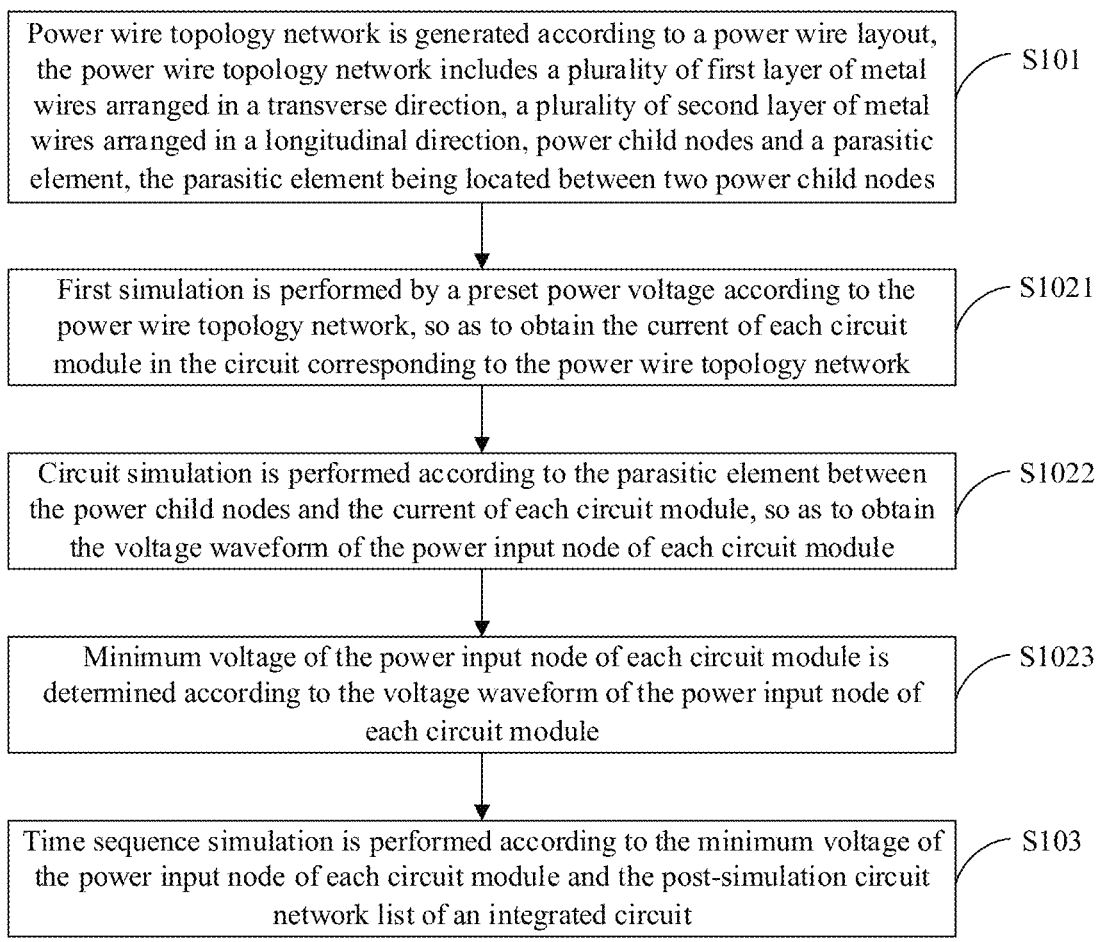
FIG. 6 is a flow schematic diagram of a simulation method according to embodiments of this application.

FIG. 6 is a flow schematic diagram of a simulation method according to embodiments of this application. As shown in FIG. 6, the simulation method of this embodiment is based on the method shown in FIG. 5, optionally, the S102 can be implemented by the following steps.

At S1021, a first simulation is performed by a preset power voltage according to the power wire topology network, so as to obtain the current of each circuit module in the circuit corresponding to the power wire topology network.

In some embodiments, taking six circuit modules shown in FIG. 5 as an example, the first simulation is performed by the preset power voltage according to the power wire topology network shown in FIG. 4, and the current of the obtained six circuit modules is as shown in Table 1.

TABLE 1

Current of Six Circuit Modules

| Circuit module | Current |
|---|---|
| X1 | I1 (t) |
| X2 | I2 (t) |
| X3 | I3 (t) |
| X4 | I4 (t) |
| X5 | I5 (t) |
| X6 | I6 (t) |

Herein, current In (t), n=1, 2, . . . , 6 is a curve that changes over time.

At S1022, the circuit simulation is performed according to the parasitic element between the power child nodes and the current of each circuit module, so as to obtain the voltage waveform of the power input node of each circuit module.

As an implementable mode, the above S1022 can include the following operations.

First, the current source is set for each circuit module according to the current of each circuit module, so as to obtain a test circuit.

In some embodiments, the current source can be set for the power wire topology network, one current source is set for each circuit module, and the quantity of the current source is the same as that of the circuit module included in the circuit corresponding to the power wire topology network. The input current of each set current source is the current In (t) of each circuit module, and then the test circuit is obtained.

Figure 7:
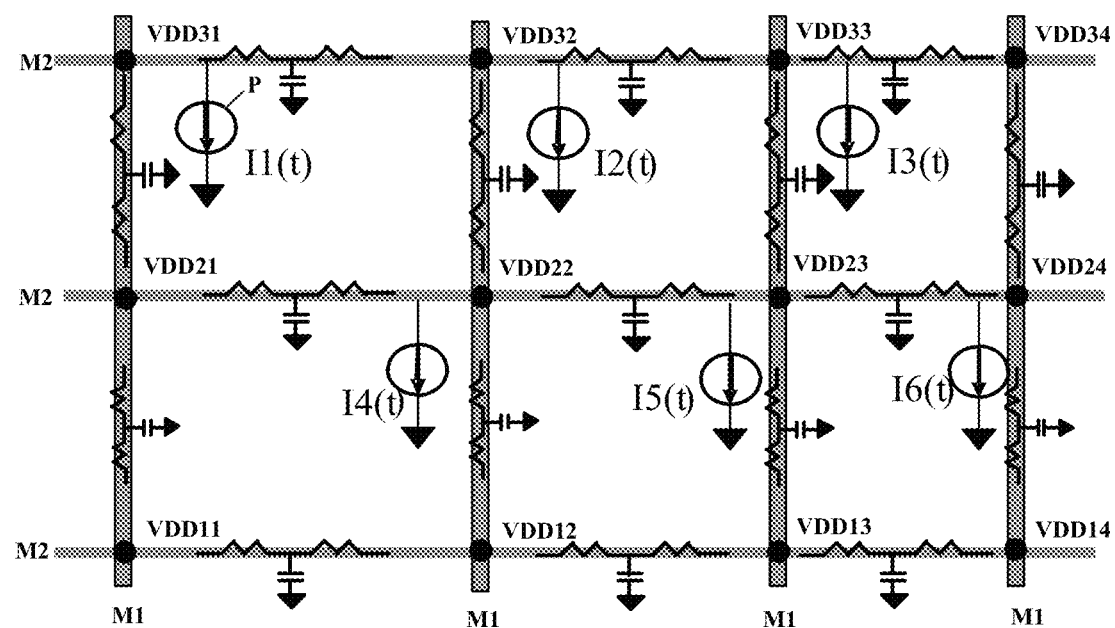
FIG. 7 is a schematic diagram of the test circuit corresponding to FIG. 4.

Taking the power wire topology network shown in FIG. 4 as an example, FIG. 7 is a schematic diagram of the test circuit corresponding to FIG. 4. The test circuit in this embodiment is also named as the IR-Drop test circuit. As shown in FIG. 7, the first end of each current source P is connected to the power input node of each circuit module, and the second end of each current source P is connected to the grounding terminal. Taking the circuit module X1 as an example, the first end of the current source P is connected to the power input node VDD31 of the circuit module X1, and the second end of the current source P is connected with the grounding terminal.

Then, the test circuit is subjected to circuit simulation according to the parasitic element between the power child nodes and the current of each circuit module, so as to obtain the voltage waveform of the power input node of each circuit module.

In some embodiments, the test circuit is subjected to the circuit simulation after the test circuit is obtained, so as to obtain the voltage waveform of the power input node of each circuit module. Taking the test circuit shown in FIG. 7 as an example, for each circuit module in the test circuit, taking the circuit module X1 as an example, the circuit simulation is performed according the current In (t) of the circuit module X1 and parasitic element Q between the power child node VDD31 and the power child node VDD32 in the circuit module X1. The simulation can be performed by a Simulation Program with Integrated Circuit Emphasis (Spice), so as to obtain the voltage waveform VDD31 (t) of the power input node VDD31 of each circuit module X1, and description is made herein by taking a circuit module X1 as an example. It can be understood that the test circuit is subjected to the simulation, so as to obtain the voltage waveform VDD31(t)-VDD24(t) of the power input nodes of the six circuit modules.

At S1023, the minimum voltage of the power input node of each circuit module is determined according to the voltage waveform of the power input node of each circuit module.

In some embodiments, the voltage waveform is an oscillogram of a voltage value that changes with time, the minimum voltage value of each voltage waveform can be found out according to the voltage waveform, namely, the minimum voltage of the power input node of each circuit module is the voltage during a time period, and the voltage is recorded as VDDn min in Table 2. Table 2 shows a relationship among the current In (t) corresponding to each module in the test circuit shown in FIG. 7, the voltage waveform VDDn (t) of the power input node of each circuit module and the minimum voltage VDDn min of the power input node of each circuit module.

TABLE 2

| Circuit module | Current | Voltage waveform of the power input node | Minimum voltage of the power input node of each circuit module |
|---|---|---|---|
| X1 | I2 (t) | VDD31 (t) | VDD31min |
| X2 | I2 (t) | VDD32 (t) | VDD32min |
| X3 | I3 (t) | VDD33 (t) | VDD33min |
| X4 | I4 (t) | VDD22 (t) | VDD22min |
| X5 | I5 (t) | VDD23 (t) | VDD23min |
| X6 | I6 (t) | VDD24 (t) | VDD24min |

According to the simulation method provided by the embodiments, the first simulation is performed with a preset power voltage according to the power wire topology network, so as to obtain the current of each circuit module in the circuit corresponding to the power wire topology network. The circuit simulation is performed according to the parasitic element between the power child nodes and the current of each circuit module, so as to obtain the voltage waveform of the power input node of each circuit module, and then the minimum voltage of the power input node of each circuit module is determined according to the voltage waveform of the power input node of each circuit mode, so as to determine the minimum voltage of the power input node of each circuit module in the circuit corresponding to the power wire topology network.

Figure 8:
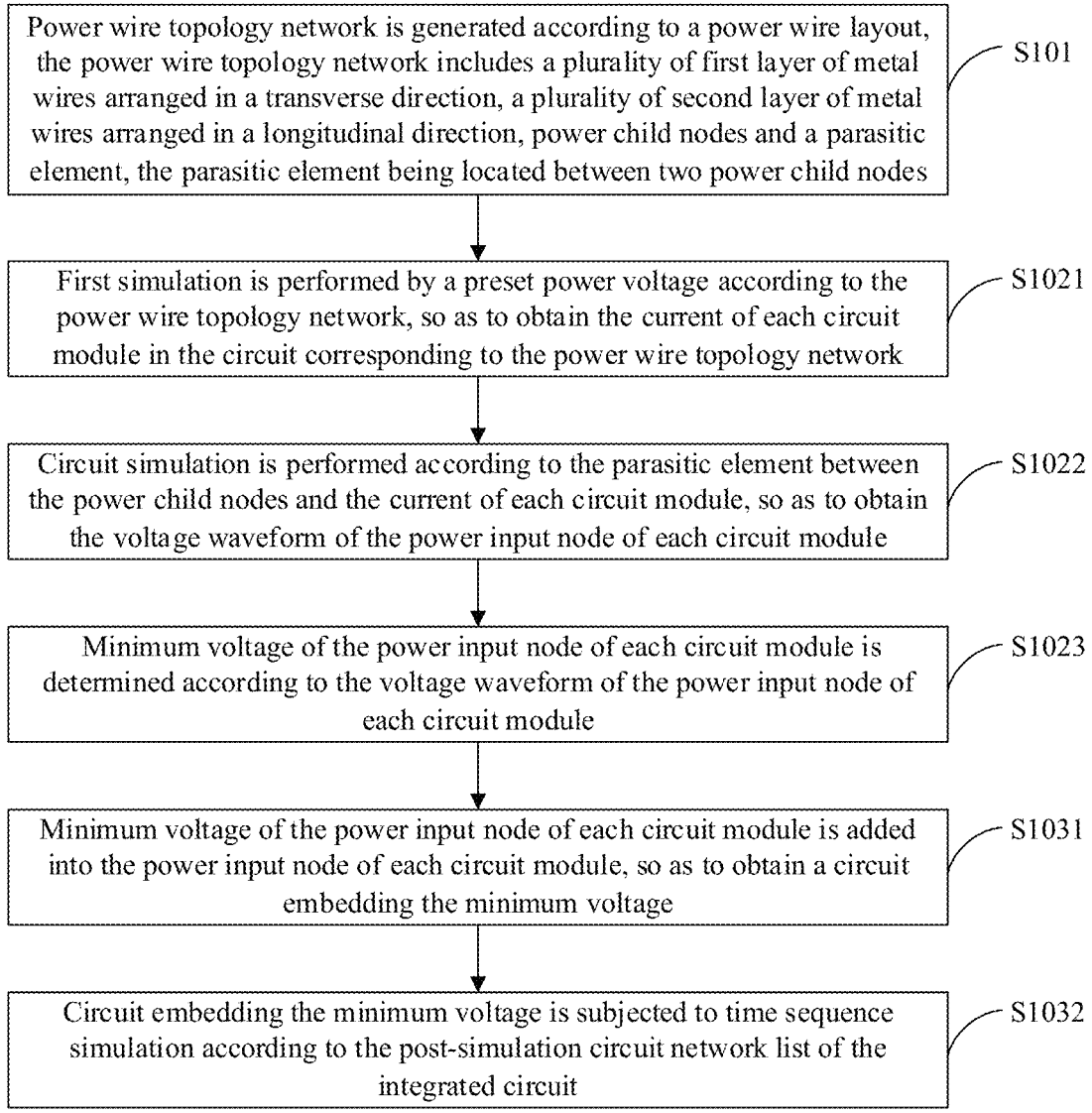
FIG. 8 is a flow schematic diagram of a simulation method according to embodiments of this application.

FIG. 8 is a flow schematic diagram of a simulation method according to embodiments of this application. As shown in FIG. 8, the simulation method of this embodiment is based on the method shown in FIG. 6, optionally, the S103 can be implemented by the following steps.

At S1031, the minimum voltage of the power input node of each circuit module is added to the power input node of each circuit module, so as to obtain the circuit embedding the minimum voltage.

Figure 9:
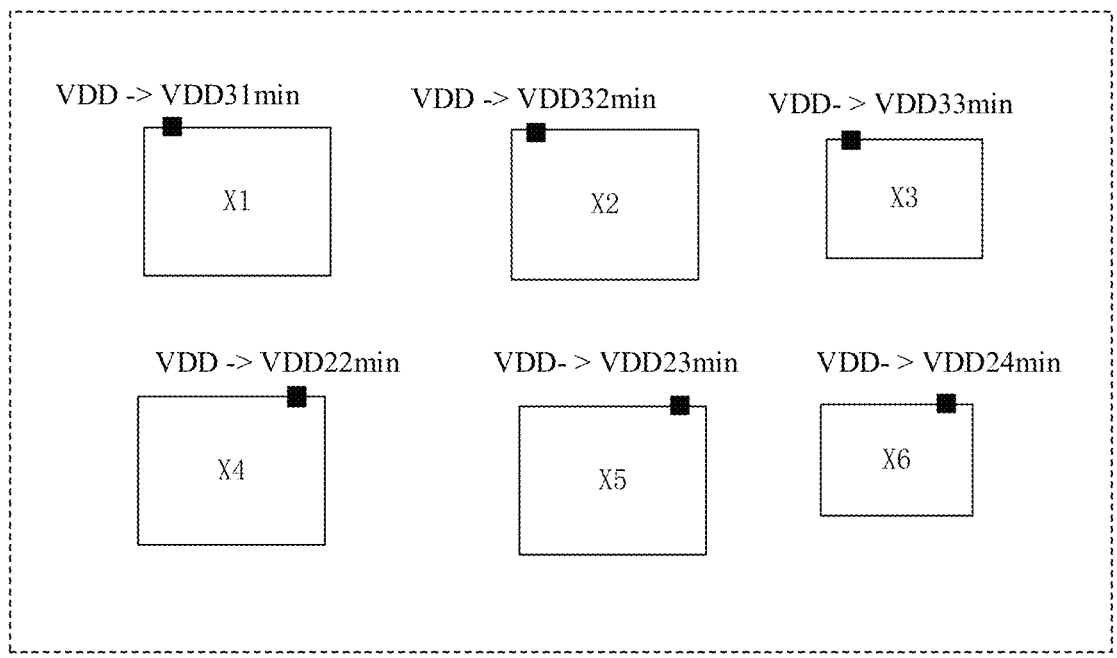
FIG. 9 is a schematic diagram of a circuit structure obtained through adding the minimum voltage of a power input node of each circuit module into a power input node of each circuit module.

In some embodiments, FIG. 9 is a schematic diagram of a circuit structure obtained through adding the minimum voltage of a power input node of each circuit module to a power input node of each circuit module.

At S1032, the circuit embedding the minimum voltage is subjected to time sequence simulation according to the post-simulation circuit network list of the integrated circuit.

In some embodiments, the circuit embedding the minimum voltage is subjected to time sequence simulation according to the post-simulation circuit network list of the integrated circuit, and the obtained simulation result is the time sequence analysis result considering the influence of the maximum pressure drop. According to the simulation method of this embodiment, the influence of the power wire IP-Drop on the time sequence parameter of the integrated circuit is accurately evaluated without adding the simulation time. All results are based on Spice and layout post-simulation network list, and the simulation precision is ensured, thereby achieving the compromise between simulation precision and simulation speed.

Figure 10:
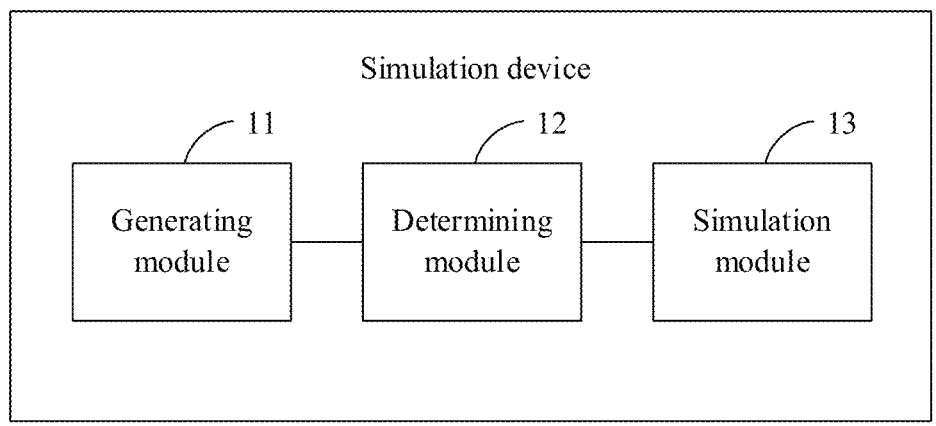
FIG. 10 is a structural schematic diagram of a simulation device according to embodiments of this application.

FIG. 10 is a structural schematic diagram of a simulation device according to embodiments of this application. As shown in FIG. 10, the simulation device of this embodiment can include a generating module 11, a determining module 12 and a simulation module 13. Herein, the generating module 11 is configured to generate the power wire topology network according to the power wire layout, the power wire topology network includes a plurality of first layer of metal wires arranged in a transverse direction, a plurality of second layer of metal wires arranged in a longitudinal direction, power child nodes and a parasitic element, and the parasitic element is located between the two power child nodes.

The determining module 12 is configured to determine the minimum voltage of a power input node of each circuit module in a circuit corresponding to the power wire topology network, and the power input node is one of the power child nodes in each circuit module.

The simulation module 13 is configured to perform the time sequence simulation according to the minimum voltage of the power input node of each circuit module and the post-simulation circuit network list of an integrated circuit.

In some embodiments, the generating module 11 is configured to determine the intersections of the first layer of metal wires and the second layer of metal wires as the power child nodes.

The parasitic element is arranged between every two power child nodes, and the parasitic element includes a first parasitic resistance, a second parasitic resistance and a parasitic capacitance. Herein, a first end of the first parasitic resistance is connected to the first power child node, a second end of the first parasitic resistance is connected to a first end of the second parasitic resistance and a first end of the parasitic resistance, a second end of the second parasitic resistance is connected to the second power child node, and a second end of the parasitic resistance is connected to a grounding terminal.

The power wire topology network is obtained according to the first layer of metal wires, the second layer of metal wires, the power child nodes and the parasitic element.

In some embodiments, the resistance values of the first parasitic resistance and the second parasitic resistance are each R/2, and the capacitance value of the parasitic capacitance is C.

R and C are determined by the following formula.

$$R = Rsh * L/W;$$

$$C = Cu * L * W.$$

Herein, L is the length of a metal wire between the power child nodes, W is the width of the metal wire between the power child nodes, Rsh is the sheet resistance value of the metal, and Cu is the capacitance value of a unit area.

In some embodiments, the determining module 12 is configured to:
perform the first simulation by a preset power voltage according to the power wire topology network, so as to obtain the current of each circuit module in the circuit corresponding to the power wire topology network;
perform the circuit simulation according to the parasitic element between the power child nodes and the current of each circuit module, so as to obtain the voltage waveform of the power input node of each circuit module; and
determine the minimum voltage of the power input node of each circuit module according to the voltage waveform of the power input node of each circuit module.

In some embodiments, the determining module 12 is configured to: set the current source for each circuit module according to the current of each circuit module, so as to obtain a test circuit; and
perform circuit simulation on the test circuit according to the parasitic element between the power child nodes and the current of each circuit module, so as to obtain the voltage waveform of the power input node of each circuit module.

In some embodiments, the simulation module 13 is configured to add the minimum voltage of the power input node of each circuit module to the power input node of each circuit module, so as to obtain the circuit embedding the minimum voltage; and
perform time sequence simulation on the circuit embedding the minimum voltage according to the post-simulation circuit network list of the integrated circuit.

According to the device provided by the embodiments of this application, the above method embodiments can be executed, the implementation principles and technical effects can refer to the above method embodiments, and details will not be made herein.

Figure 11:
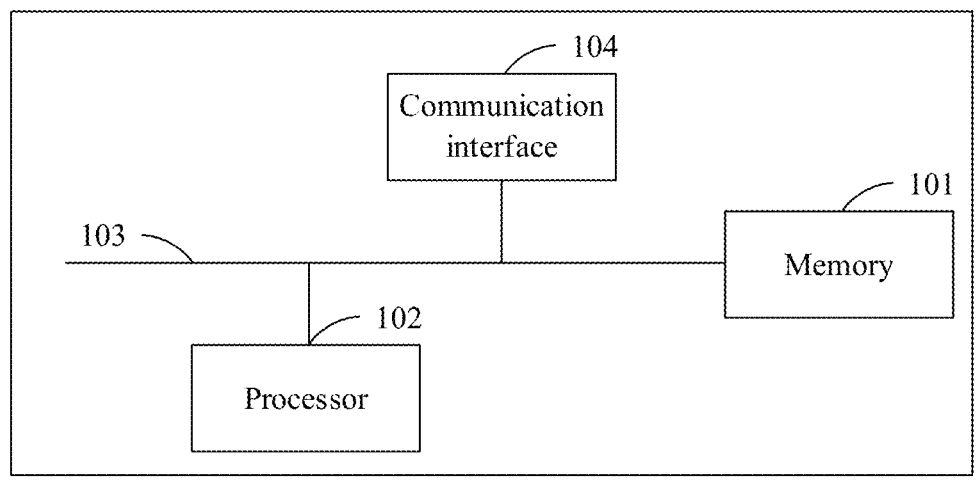
FIG. 11 is a structural schematic diagram of a simulation device according to embodiments of this application.

FIG. 11 is a structural schematic diagram of a simulation device according to embodiments of this application. As shown in FIG. 0.11, the simulation device of this embodiment can include a memory 101 and a processor 102.

The memory 101 is configured to store an executable instruction of the processor 102.

The processor 102 is configured to:
generate a power wire topology network according to a power wire layout. The power wire topology network includes a plurality of first layer of metal wires arranged in a transverse direction, a plurality of second layer of metal wires arranged in a longitudinal direction, power child nodes and a parasitic element, and the parasitic element is located between the two power child nodes;
determine the minimum voltage of a power input node of each circuit module in a circuit corresponding to the power wire topology network, and the power input node is one of the power child nodes in each circuit module; and
perform time sequence simulation according to the minimum voltage of the power input node of each circuit module and the post-simulation circuit network list of the integrated circuit.

Optionally, the memory 101 can be independent, or integrated with the processor 102.

When memory 101 is independent of a device other than the processor 102, the simulation device of this embodiment can further include a bus 103.

The bus 103 is configured to connect the memory 101 and the processor 102.

Optionally, this embodiment further includes a communication interface 104, which can be connected to the processor 102 through the bus 103.

The device can be configured to execute various steps and/or processes in the above method embodiments.

Embodiments of this application further provide a computer-readable storage medium, which stores a computer execution instruction, and when the instruction runs on a computer, the computer executes the method of the above embodiment.

Embodiments of this application further provide a computer program product, which includes a computer program, and when being executed by a processor, the computer program implements the method of the above embodiment.

Embodiments of this application further provide a power wire topology network and a test circuit, which are described below in combination with FIG. 3, FIG. 4 and FIG. 7.

Embodiments of this application further provide a power wire topology network, which includes a plurality of first layer of metal wires arranged in a transverse direction, a plurality of second layer of metal wires arranged in a longitudinal direction, power child nodes and a parasitic element. The parasitic element is located between the two power child nodes, and the intersections of the first layer of metal wires and the second layer of metal wires are the power child nodes.

Taking the power wire topology network show in FIG. 3 as an example, as shown in FIG. 3, the power wire topology network includes a plurality of first layer of metal wires M1 arranged in a transverse direction, a plurality of second layer of metal wires M2 arranged in a longitudinal direction, power child nodes (VDD11-VDD31) and a parasitic element Q. Herein, the intersections of the first layer of metal wires M1 and the second layer of metal wires M2 are the power child nodes, the parasitic element is located between the two power child nodes, and one parasitic element is arranged between every two power child nodes.

Optionally, the parasitic element includes a first parasitic resistance, a second parasitic resistance and a parasitic capacitance. Herein, a first end of the first parasitic resistance is connected to the first power child node, a second end of the first parasitic resistance is connected to a first end of the second parasitic resistance and a first end of the parasitic capacitance, a second end of the second parasitic resistance is connected to the second power child node, and a second end of the parasitic capacitance is connected to a grounding terminal.

Taking the power wire layout shown in FIG. 4 as an example, as shown in FIG. 4, the parasitic element Q includes a first parasitic resistance R1, a second parasitic resistance R2 and a parasitic capacitance C1. Taking the parasitic element between the power child node VDD31 and the power child node VDD32 as an example, the first end of the first parasitic resistance R1 is connected to the first power child node VDD31, the second end of the first parasitic resistance R1 is connected to the first end of the second parasitic resistance R2 and the first end of the parasitic capacitance C1, the second end of the second parasitic resistance R2 is connected to the second power child node VDD32, and the second end of the parasitic capacitance C1 is connected with the grounding terminal.

Optionally, the resistance values of the first parasitic resistance and the second parasitic resistance are each R/2, and the capacitance value of the parasitic capacitance is C.

R and C are determined by the following formula.

$$R = Rsh * L/W;$$

$$C = Cu * L * W.$$

Herein, L is the length of a metal wire between the power child nodes, W is the width of the metal wire between the power child nodes, Rsh is the sheet resistance value of the metal, and Cu is the capacitance value of a unit area.

It should be noted that the power wire topology network show in FIG. 3 and FIG. 4 are only for examples, and the quantity of the first layer of metal wires M1 and the second layer of metal wires M2 can be randomly set in actual design.

The power wire topology network provided by this embodiment can be configured to implement the above simulation method. For example, the power wire topology network can be directly simulated through S102-S103 in the simulation method shown in FIG. 1, thus the post-simulation result can be quickly obtained, the simulation speed is improved, and the time sequence simulation considers the minimum voltage of the power input node of each circuit module. The difference between the minimum voltage and the ideal power voltage is power wire IR-Drop, therefore the influence of the power wire IR-Drop on the time sequence parameter of the integrated circuit can be evaluated through the normal time sequence simulation, and the simulation precision can be improved, thereby achieving the compromise between simulation precision and simulation speed.

Embodiments of this application further provide a test circuit, which includes at least one current source and the power wire topology network in the above embodiment, such as the power wire topology network shown in FIG. 3 or FIG. 4. In the test circuit, the input current of each current source is the current of each circuit module in the circuit corresponding to the power wire topology network, and the quantity of the current source is the same as that of the circuit module included in the circuit corresponding to the power wire topology network.

In some embodiments, the first end of each current source is the power input node of each circuit module, the second end of each current source is connected to the grounding terminal, and the power input node is one of the power child nodes in each circuit module.

Optionally, the current of each circuit module in the circuit corresponding to the power wire topology network is obtained based on that the power wire topology network is subjected to the first simulation with the preset power voltage.

Taking the test circuit shown in FIG. 7 as an example, there are six current sources in the test circuit shown in FIG. 7, and the quantity of the power source is the same as the quantity 6 of the circuit module. The first end of each current source P is connected to the power input node of each circuit module, and the second end of each current source P is connected to the grounding terminal. Taking the circuit module X1 as an example, the first end of the current source P is connected to the power input node VDD31 of the circuit module X1, and the second end of the current source P is connected with the grounding terminal.

The test circuit provided by this embodiment can be configured to how to determine the minimum voltage of the power input node of each circuit module in the circuit corresponding to the power wire topology network in the above simulation method. The circuit simulation can be directly performed through the test circuit, so as to obtain the voltage waveform of the power input node of each circuit module. The minimum voltage of the power input node of each circuit module can be determined according to the voltage waveform of the power input node of each circuit module, therefore the time sequence simulation can be performed according to the minimum voltage of the power input node of each circuit module and the post-simulation circuit network list of the integrated circuit.

Finally, it should be noted that the above embodiments are merely used for illustrating the technical solution of this application instead of limiting it. Although this application is described in details with reference to the abovementioned embodiments. Those of ordinary skill in the art should understand that they can still make modifications to the technical solution recorded in the abovementioned embodiments, or make equivalent replacements to part or all of technical characteristics. However, these modifications or replacement do not separate the nature of the corresponding technical solution from the scope of the technical solution of various embodiments of this application.

What is claimed is:

1. A simulation method, comprising:
generating a power wire topology network according to a power wire layout, the power wire topology network comprising a plurality of first layer of metal wires arranged in a transverse direction, a plurality of second layer of metal wires arranged in a longitudinal direction, power child nodes, and a parasitic element, the parasitic element being located between two power child nodes;
determining a minimum voltage of a power input node of each circuit module in a circuit corresponding to the power wire topology network, the power input node being one of the power child nodes in each circuit module;
performing time sequence simulation according to the minimum voltage of the power input node of each circuit module and a post-simulation circuit network list of an integrated circuit, wherein the post-stimulation circuit network list of the integrated circuit does not comprise a parasitic capacitance or a parasitic resistance; and
performing post-stimulation by using the parasitic capacitance and the parasitic resistance after the time sequence simulation is completed.

2. The method of claim 1, wherein said generating the power wire topology network according to the power layout comprises:
determining intersections of the first layer of metal wires and the second layer of metal wires as the power child nodes;
arranging the parasitic element between every two power child nodes, the parasitic element comprising a first parasitic resistance, a second parasitic resistance, and a parasitic capacitance, wherein a first end of the first parasitic resistance is connected to a first power child node, a second end of the first parasitic resistance is connected to a first end of the second parasitic resistance and a first end of the parasitic capacitance, a second end of the second parasitic resistance is connected to a second power child node, and a second end of the parasitic capacitance is connected to a grounding terminal; and obtaining the power wire topology network according to the first layer of metal wires, the second layer of metal wires, the power child nodes, and the parasitic element.

3. The method of claim 2, wherein resistance values of the first parasitic resistance and the second parasitic resistance are each R/2, and a capacitance value of the parasitic capacitance is C;

R and C are determined with a following formula:

$R = Rsh * L/W;$ $C = Cu * L * W;$ wherein L is a length of a metal wire between the power child nodes, W is a width of the metal wire between the power child nodes, Rsh is a sheet resistance value of the metal, and Cu is a capacitance value of a unit area.

4. The method of claim 1, wherein said determining the minimum voltage of the power input node of each circuit module in the circuit corresponding to the power wire topology network comprises:
performing a first simulation based a preset power voltage according to the power wire topology network, so as to obtain a current of each circuit module in the circuit corresponding to the power wire topology network;
performing a circuit simulation according to the parasitic element between the power child nodes and the current of each circuit module, so as to obtain a voltage waveform of the power input node of each circuit module; and
determining a minimum voltage of the power input node of each circuit module according to the voltage waveform of the power input node of each circuit module.

5. The method of claim 4, wherein said performing the circuit simulation according to the parasitic element between the power child nodes and the current of each circuit module, so as to obtain the voltage waveform of the power input node of each circuit module comprises:
setting a current source for each circuit module according to the current of each circuit module, so as to obtain a test circuit; and
performing the circuit simulation on the test circuit according to the parasitic element between the power child nodes and the current of each circuit module, so as to obtain the voltage waveform of the power input node of each circuit module.

6. The method of claim 1, wherein said performing time sequence simulation according to the minimum voltage of the power input node of each circuit module and the post-simulation circuit network list of an integrated circuit comprises:
adding the minimum voltage of the power input node of each circuit module into the power input node of each circuit module, so as to obtain a circuit embedding the minimum voltage; and
performing a time sequence simulation on the circuit embedding the minimum voltage according to the post-simulation circuit network list of the integrated circuit.

7. A simulation device, comprising a memory and a processor;
wherein the memory is configured to store an executable instruction of the processor;
wherein the processor is configured to:
generate a power wire topology network according to a power wire layout, wherein the power wire topology network comprises a plurality of first layer of metal wires arranged in a transverse direction, a plurality of second layer of metal wires arranged in a longitudinal direction, power child nodes and a parasitic element, and the parasitic element is located between two power child nodes;

determine a minimum voltage of a power input node of each circuit module in a circuit corresponding to the power wire topology network, and the power input node is one of the power child nodes in each circuit module;

perform a time sequence simulation according to the minimum voltage of the power input node of each circuit module and the post-simulation circuit network list of an integrated circuit, wherein the post-stimulation circuit network list of the integrated circuit does not comprise a parasitic capacitance or a parasitic resistance; and perform post-stimulation by using the parasitic capacitance and the parasitic resistance after the time sequence simulation is completed.

8. A non-transitory computer-readable storage medium having computer-executable instructions stored thereon for execution by a processor to implement the method of claim 1.

9. The non-transitory computer-readable storage medium of claim 8, wherein said generating the power wire topology network according to the power layout comprises:

determining intersections of the first layer of metal wires and the second layer of metal wires as the power child nodes;

arranging the parasitic element between every two power child nodes, the parasitic element comprising a first parasitic resistance, a second parasitic resistance, and a parasitic capacitance, wherein a first end of the first parasitic resistance is connected to a first power child node, a second end of the first parasitic resistance is connected to a first end of the second parasitic resistance and a first end of the parasitic capacitance, a second end of the second parasitic resistance is connected to a second power child node, and a second end of the parasitic capacitance is connected to a grounding terminal; and obtaining the power wire topology network according to the first layer of metal wires, the second layer of metal wires, the power child nodes, and the parasitic element.

10. The non-transitory computer-readable storage medium of claim 9, wherein resistance values of the first parasitic resistance and the second parasitic resistance are each R/2, and a capacitance value of the parasitic capacitance is C;

R and C are determined with a following formula:

$R = Rsh * L/W;$ $C = Cu * L * W;$ wherein L is a length of a metal wire between the power child nodes, W is a width of the metal wire between the power child nodes, Rsh is a sheet resistance value of the metal, and Cu is a capacitance value of a unit area.

11. The non-transitory computer-readable storage medium of claim 8, wherein said determining the minimum voltage of the power input node of each circuit module in the circuit corresponding to the power wire topology network comprises:

performing a first simulation based a preset power voltage according to the power wire topology network, so as to obtain a current of each circuit module in the circuit corresponding to the power wire topology network;

performing a circuit simulation according to the parasitic element between the power child nodes and the current of each circuit module, so as to obtain a voltage waveform of the power input node of each circuit module; and determining a minimum voltage of the power input node of each circuit module according to the voltage waveform of the power input node of each circuit module.

12. The non-transitory computer-readable storage medium of claim 11, wherein said performing the circuit simulation according to the parasitic element between the power child nodes and the current of each circuit module, so as to obtain the voltage waveform of the power input node of each circuit module comprises:

setting a current source for each circuit module according to the current of each circuit module, so as to obtain a test circuit; and performing the circuit simulation on the test circuit according to the parasitic element between the power child nodes and the current of each circuit module, so as to obtain the voltage waveform of the power input node of each circuit module.

13. The non-transitory computer-readable storage medium of claim 8, wherein said performing time sequence simulation according to the minimum voltage of the power input node of each circuit module and the post-simulation circuit network list of an integrated circuit comprises:

adding the minimum voltage of the power input node of each circuit module into the power input node of each circuit module, so as to obtain a circuit embedding the minimum voltage; and performing a time sequence simulation on the circuit embedding the minimum voltage according to the post-simulation circuit network list of the integrated circuit.

* * * * *